US007213029B2

(12) United States Patent
Nelson et al.

(10) Patent No.: US 7,213,029 B2
(45) Date of Patent: May 1, 2007

(54) QUIESCING WORK BOUNDED BY APPLICATION TRANSACTIONS CONSISTING OF MULTIPLE RELATIONAL DATABASE TRANSACTIONS

(75) Inventors: Kenneth Carlin Nelson, Hollister, CA (US); Dwayne Lorenzo Richardson, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 10/449,272

(22) Filed: May 29, 2003

(65) Prior Publication Data

US 2004/0243558 A1 Dec. 2, 2004

(51) Int. Cl.
*G06F 17/30* (2006.01)

(52) U.S. Cl. .............................. 707/103 R; 707/104.1; 707/10; 707/204

(58) Field of Classification Search ..................... None
See application file for complete search history.

(56) References Cited

U.S. PATENT DOCUMENTS

| 5,367,698 | A | 11/1994 | Webber et al. .............. 395/800 |
| 5,485,608 | A | 1/1996 | Lomet et al. ................ 395/600 |
| 5,524,205 | A | 6/1996 | Lomet et al. ........... 395/182.14 |
| 5,729,733 | A | 3/1998 | Sharif-Askary ............. 395/608 |
| 5,799,305 | A | 8/1998 | Bortvedt et al. .............. 707/10 |
| 6,163,855 | A | 12/2000 | Shrivastava et al. ........... 714/4 |
| 6,873,995 | B2 * | 3/2005 | Benson et al. .......... 707/103 R |
| 2002/0073082 | A1 | 6/2002 | Duvillier et al. ............... 707/3 |

FOREIGN PATENT DOCUMENTS

| EP | 0 465 019 B1 | 1/1992 |
| EP | 1 241 592 A2 | 2/2002 |

* cited by examiner

*Primary Examiner*—Alford Kindred
*Assistant Examiner*—Belix M. Ortiz
(74) *Attorney, Agent, or Firm*—Richard Goldman

(57) ABSTRACT

Disclosed is a system and method for coordinating the backup of multiple databases and file systems in a Content Manager system. This is accomplished by "pausing" the library server to enable the desired coordinated backup of all servers, that is, the Library Servers and the Resource Servers. The coordinated backup is accomplished by both "pausing" and coordinated backup, and without interrupting a transaction which is in progress. This is accomplished by a consideration of the full CM transaction rather then just the individual elemental library server and resource manager transactions. The effect is to allow existing operations to complete, and involves "pausing" the library server to enable coordinated backup of all servers without interrupting a content management transaction which is in progress, if they complete within an interval specified by the administrator.

15 Claims, 1 Drawing Sheet

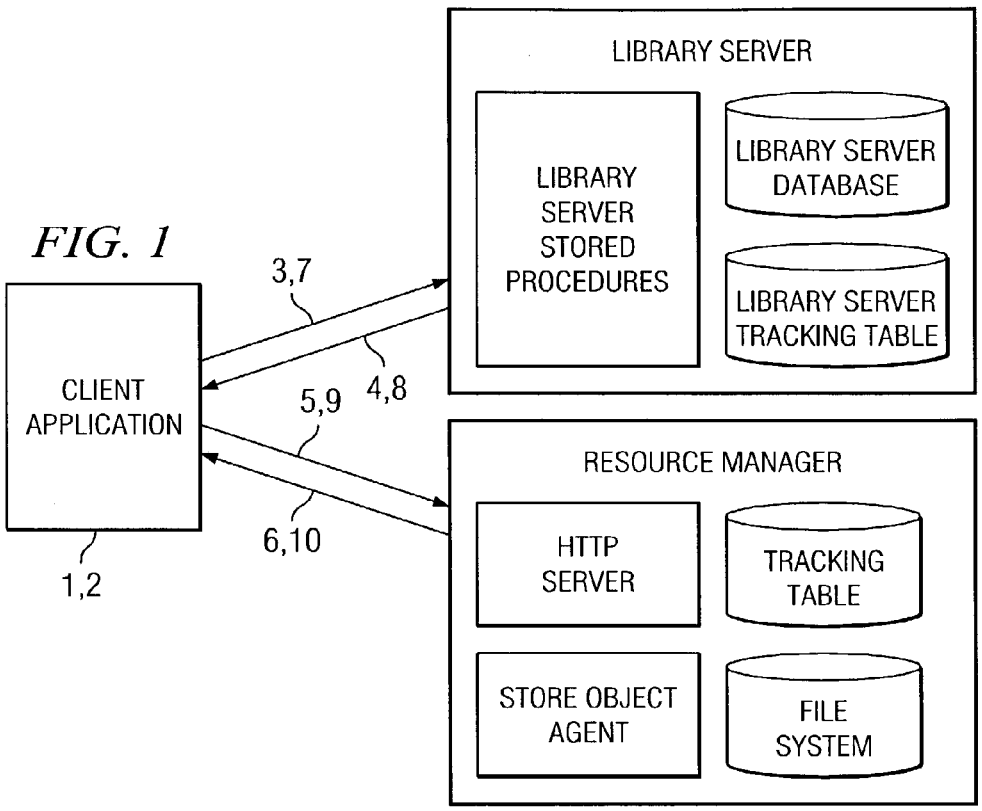

QUIESCING WORK BOUNDED BY APPLICATION TRANSACTIONS CONSISTING OF MULTIPLE RELATIONAL DATABASE TRANSACTIONS

FIELD OF THE INVENTION

The invention relates to database management systems and more particularly to quiescing work that involves multiple relational database transactions that are bounded by application transactions.

BACKGROUND OF THE INVENTION

Content Management is an infrastructure to manage the full spectrum of digital information. Large collections of scanned images, facsimiles, electronic office documents, XML and HTML files, computer output, audio, video, multimedia, and virtual reality content can be stored and accessed through the content management system. The content management system integrates content with line of business, customer service, ERP, digital asset management, distance learning, Web content management or other applications to accelerate benefits across the enterprise.

In one embodiment the content manager product may be visualized as a triangle, its three vertices being the client, a library server and an object server (resource manager). The client is the user's interface which gives the user the capability of storing, searching for, and, marking-up documents (or to use the more general term, objects). The library server is the equivalent of a card catalog which holds information about the objects, including their location. The object server (OS), also referred to herein as the resource manager (RM) is where either the actual object or a pointer to the actual object is stored.

The core Library Server logic (except for system utilities and housekeeping tasks) is packaged as a set of relational data base (RDB) stored procedures (SPs) containing embedded SQL statements. Each stored procedure (SP) is precompiled and runs on a relational database (RDB) server. Thus each Library Server (LS) process is merely a relational database (RDB) server process. The interface to a Library Server is SQL, through which either stored procedures (SPs) can be called or SQL SELECT statements (including cursor support) can be executed. Remote access to Library Server is via a relational database (RDB) client.

The Resource Managers (RMs) may support different/multiple access protocols. The resource manager (RM)—object server (OS) supports the HTTP protocol. The basic information entities managed by the Library Server are "items." "Items" as used herein come in two types, simple items and resource items. Resource items can have content associated with them that is stored in one or more Resource Managers. Resource items point to their content via Resource URL-RELATED DATA. One attribute of "items" is their "folder."

The library server (LS) and object server (OS) (resource manager (RM)) are separate processes, often running on different machines. In operation, clients first contact the library server (LS) to create/update an index for an object, and to determine where the object is to be stored/replaced. The client then sends a request to the object server (OS) to store/replace the object.

To keep track of data entries, tens or hundreds attributes (parameters) may be defined to multiple databases and file systems in a database management system (DBMS). For example, a meaningful information entity may have multiple attributes associated with it. It is also frequently necessary to add, change, and delete the attributes associated with an information entity. This gives rise to problems in coordinating the backup of the multiple databases and file systems.

One approach to this problem is in the IBM Content Manager Version 8, which implements a single CM transaction involving the library server with two separate RDB transactions and data interchange with one or more resource managers. Specifically, the logic involved to implement a content manager transaction is:

1) Call the library server to "prepare" to store an object and commit the LS transaction.
2) Store the object on a resource manager, and commit the RM transaction.
3) Call the library server to store information about the object, and commit the LS transaction.
4) Send an "end transaction" request to the resource manager to finalize the changes and commit the RM transaction.

One problem arises because Step 2, storing the object on a resource manager, and committing the RM transaction, can require a variable amount of time depending, for example, on the size of the object and the network speed. Quiescing the workload is possible, but the fact that a CM transaction involves multiple RDB transactions means merely quiescing the workload does not help solve the coordination problem. There can be cases where the operation is initiated in step 1, calling the library server to "prepare" to store an object and commit the LS transaction, but by the time the library server is called to actually "store" information about the object, and commit the LS transaction, the requests would be rejected by the RDBMC.

Thus a further need exists to be able to "pause" the library server to enable coordinated backup of all servers, but without interrupting a transaction which is in progress.

A still further need exists to be able to consider the full CM transaction instead of the elemental LS and RM transactions, and to thereby reject new operations while allowing existing operations to complete.

SUMMARY OF THE INVENTION

According to our invention it is possible to effectively coordinate the backup of the multiple databases and file systems in a Content Manager system by being able to "pause" the library server to enable the desired coordinated backup of all servers, and to accomplish both "pausing" and coordinated backup without interrupting a transaction which is in progress. We accomplish this by a consideration of the e full CM transaction instead of the elemental LS and RM transactions. The effect is to allow existing operations to complete. "Pausing" the library server enables coordinated backup of all servers, but without interrupting a content management transaction which is in progress. When initiated, any requests to the library server other than simply calling the library server to store information about the object and commit the LS transaction, should be rejected. Those requests which are already in progress are allowed to complete, but only if they complete within an interval specified by the administrator.

Because a CM transaction involves multiple RDB transactions, quiescing RDBMS work does not solve the problem of coordinating the backup of multiple databases and file systems. There will still be cases where between the time of calling the library server to "prepare" to store an object and to "commit" the LS transaction, and, subsequently, calling the library server to actually store information about the object, and commit the LS transaction, pending requests are rejected by the RDMS. More precisely, treating the full CM transaction as a single integrated transaction instead of the elemental LS and RM transactions, it is possible to reject new operations but allow existing operations to complete. This function will be accomplished by 1) Introducing a value in a control table, for example, the system control table, to indicate the time in the future at which the workload is to be quiesced.
2) Using a maximum transaction value to limit the time during which step 3 may be called, and reject to step 3 and the store operation after the MAXTXDURATION value.
3) When the specified time interval or duration in which the workload is to be quiesced is reached, each request arriving at the server is checked to see if a transaction is in progress. If no incomplete transactions exist, the newly arriving request will be rejected with a new return code. If such an incomplete transaction exists, the request will processed.
4) When the library server no longer needs to be quiesced, such as at the completion of a backup, the value in the control table that indicates the time in the future at which the workload is to be quiesced field may be set to null or to a future time.

A still further aspect of our invention is a program product.

THE FIGURES

FIG. 1 is an overview of the three elements of a content management system, the client application, the library server, and the resource manager, and the actions between them in-storing and replacing an item.

FIG. 2 is a high level flowchart of the method of the invention.

DETAILED DESCRIPTION OF THE INVENTION

FIG. 1 illustrates the client 2 the library server, and the resource server, and how they interact to store an item. As shown in the FIGURE, a client application, a library server, and a resource manager are running. The library server includes library server stored procedures, a library server database, and a library server tracking table. The resource manager includes an HTTP server, a Content Management resource manager "Store Object" agent, a resource manager tracking table data base, and a file system.

At a high level, the client 2 begins a transaction, 1, by sending a request to the library server to create a catalog entry (as an index entry) for a content management object, 3. In response, the client 2 receives information back from the library server as to where to store the object, 4. The client 2 then sends a request to the resource manager to store the object, 5. The client 2 receives a response, 6, from the resource manager with object metadata. This metadata includes, by way of exemplification, the object name, size, and creation timestamp. The client 2 sends this metadata to the library server, 7, where it is stored in one or more tables. The library server replies to the client indicating success or failure of the of the metadata update, 8, at which point the client commits the library server updates, 9. After committing the library server updates, the client 2 sends "end transactions" to the resource manager to delete its tracking table record. The client 2 receives a reply 10 from the resource manager indicating success or failure in completing the processing requested.

The method, system, and program product described herein "pauses" the library server to enable coordinated backup of all servers, without interrupting a transaction which is in progress. When initiated, any requests to the library server other than checking to see if a transaction is in progress and initiating appropriate with respect thereto (i.e., if no incomplete transactions exist, the newly arriving request will be rejected with a new return code, but if such an incomplete transaction exists, the request will process) will be rejected. Those requests which are already in progress are allowed to complete, but only if they can complete within an interval specified by the administrator or otherwise set in the system.

Within the context of considering the full CM transaction instead of the elemental LS and RM transactions, it is possible to reject new operations but allow existing operations to complete. According to our invention and as illustrated by the flowchart of FIG. 2, this accomplished by 1) Introducing a value in a control table, for example, the system control table (typically in the library server), to indicate the time in the future at which the workload is to be quiesced. Introducing a PAUSESERVER value in the system control table. This is illustrated by block 21 of FIG. 2. This will be defined as a timestamp, and indicates the time in the future at which the workload is to be quiesced.
2) The existing MAXTXDURATION value will be used to limit the time during which step 3, below, may be called. After this time has passed, any call to step 3, below, would be rejected and the store operation to the resource manager would be "rolled back" using existing CM logic. This uses the maximum transaction value to limit the time during which step 3 may be called, and reject to step 3 and the store operation after the MAXTXDURATION value. Typically the MAXTXDURATION value is stored in the library server. This is illustrated by block 22 of FIG. 2.
3) When the specified time interval or duration in which the workload is to be quiesced is reached, each request arriving at the server is checked to see if a transaction is in progress. If no incomplete transactions exist, the newly arriving request will be rejected with a new return code. If such an incomplete transaction exists, the request will be processed. When the time specified in PAUSESERVER is reached, each request arriving at the server will be checked to see if a transaction is in progress. This is accomplished by querying the library server transaction table ICMSTIXLT to see if incomplete transactions which were started more recently than the current time minus the time in MAXTXDURATION for the logged on user exist. If not, the request will be rejected with a new return code interpreted by client applications to display a message such as "CM Library Server has been paused—try later". If such a transaction record exists, the request will processed. This step is illustrated by block 23 of FIG. 2.
4) When the library server no longer needs to be quiesced, such as at the completion of a backup, the value in the control table that indicates the time in the future at which the workload is to be quiesced, i.e., the PAUSESERVER field, may be set to null or to a future time. This is illustrated in block 24 of FIG. 2

A program product is computer readable program code on one or more media, said program code being capable of controlling and configuring a computer system having one or more computers. The one or more computers may be configured and controlled to carry out the method described herein. Alternatively, the program may be one or more of encrypted or compressed for subsequent installation, and may be resident on media or on an installation server.

While our invention has been described with respect to certain preferred embodiments and exemplifications, it is not intended to be limited thereby, but solely by the claims appended hereto.

We claim:

1. A method of quiescing workload in a content manager system having a library server and a resource server, each of said servers including a relational database, said method comprising:
   1) introducing a value in a control table said value indicating a time at which workload is to be quiesced;
   2) setting a maximum transaction time value limiting a time during which transaction completion and quiescence are determined for a particular transaction;
   3) when the maximum transaction time value set in step 2) is reached, each request arriving at the library server is checked to determine if a later incomplete transaction is in progress,
      a) rejecting a newly arriving request if no incomplete transaction exists and
      b) processing the newly arriving request if an incomplete transaction exists; and
   4) resetting the value in the control table when the library server no longer needs to be quiesced at the completion of a backup, the value in the control table, that indicates a time at which the workload is to be quiesced is set to null or to a future time.

2. The method of claim 1 comprising resetting the value in the control table when the library server no longer needs to be quiesced at the completion of a backup.

3. The method of claim 2 comprising resetting the value in the control table to null.

4. The method of claim 2 comprising resetting the value in the control table to a future time.

5. The method of claim 1 comprising introducing a timestamp in the control table, said value indicating a time at which workload is to be quiesced.

6. The method of claim 1 comprising setting a maximum transaction time value limiting a time during which transaction completion and quiescence is determined for a particular transaction, limiting the time during which a request arriving at the server is checked to determine if a later incomplete transaction is in progress.

7. The method of claim 6 wherein after the maximum transaction time value has passed, rejecting any call the store operation.

8. A content management system comprising a plurality of relational database management systems in a client application, a library server, and a resource manager, and further comprising:
   1) a system control table, said system control table including a timestamp indicating a time at which workload is to be quiesced;
   2) a stored maximum transaction time duration value to limit the time during which incomplete transactions are executed; and
   3) programmed logic for setting said timestamp to "null" or a future time when the library server no longer needs to be quiesced;
   said relational database management systems in client application, said library server, said resource manager, said system control table, said stored maximum transaction time duration value to limit the time during which incomplete transactions are executed, and said programmed logic for setting said time stamp to "null" or a future time when the library server no longer needs to be quiesced, adapted for carrying out a method comprising:
   1) introducing the timestamp in the system control table said timestamp indicating a time at which workload is to be quiesced;
   2) setting a maximum transaction time value limiting a time during which transaction completion and quiescence are determined for a particular transaction;
   3) when the maximum transaction time value set in step 2) is reached, each request arriving at the library server is checked to determine if a later incomplete transaction is in progress,
      a) rejecting a newly arriving request if no incomplete transaction exists and
      b) processing a newly arriving request if an incomplete transaction exists; and
   4) resetting the timestamp in the control table when the library server no longer needs to be quiesced at the completion of a backup, the value in the control table, that indicates a time at which the workload is to be quiesced is set to null or to a future time.

9. A program product comprising computer readable program code on a medium, said computer readable program code being adapted to configure and control one or ore computers to operate a relational database content management system having a library server and a resource server, each of said servers including a relational database to carry out a method comprising the steps of:
   1) introducing a value in a control table said value indicating a time at which workload is to be quiesced;
   2) setting a maximum transaction time value limiting the time during which transaction completion and quiescence are determined for a particular transaction;
   3) when the maximum transaction time value set in step 2) is reached, each request arriving at the server is checked to determine if a later incomplete transaction is in progress,
      a) rejecting a newly arriving request if no incomplete transaction exists and
      b) processing a newly arriving request if incomplete transaction exists; and
   4) resetting the value in the control table when the library server no longer needs to be quiesced at the completion of a backup, the value in the control table, that indicates the time at which the workload is to be quiesced is set to null or to a future time.

10. The program product of claim 9 wherein the method comprises resetting the value in the control table when the library server no longer needs to be quiesced at the completion of a backup.

11. The program product of claim 10 wherein the method comprises resetting the value in the control table to null.

12. The program product of claim 10 wherein the method comprises resetting the value in the control table to a future time.

13. The program product of claim 9 wherein the method comprises introducing a timestamp in the control table, said value indicating a time at which workload is to be quiesced.

14. The program product of claim 9 wherein the method comprises setting a maximum transaction time value limiting the time during which transaction completion and quiescence are determined for a particular transaction, to limit the time during which a request arriving at the server is checked to determine if a later incomplete transaction is in progress.

15. The program product of claim 14 wherein after the maximum transaction time value has passed, rejecting any call the store operation.

* * * * *